(12) United States Patent
Broman et al.

(10) Patent No.: US 6,555,267 B1
(45) Date of Patent: Apr. 29, 2003

(54) MEMBRANE-SEPARATED, BIPOLAR MULTICELL ELECTROCHEMICAL REACTOR

(75) Inventors: Barry Michael Broman, Kirkland, WA (US); Andrea Zocchi, Florence (IT)

(73) Assignee: Squirrel Holding Ltd., Grand Cayman (KY)

( * ) Notice: Subject to any disclaimer, the term of this patent is extended or adjusted under 35 U.S.C. 154(b) by 0 days.

(21) Appl. No.: 09/529,726

(22) PCT Filed: Jul. 1, 1999

(86) PCT No.: PCT/IT99/00195

§ 371 (c)(1),
(2), (4) Date: Apr. 12, 2001

(87) PCT Pub. No.: WO01/03224

PCT Pub. Date: Jan. 11, 2001

(51) Int. Cl.[7] .............................. H01M 8/24; H01M 8/02
(52) U.S. Cl. ........................... 429/210; 429/14; 429/15; 429/105
(58) Field of Search ........................... 429/15, 14, 105, 429/210, 34

(56) References Cited

U.S. PATENT DOCUMENTS

| 4,751,153 A | 6/1988 | Roth | 429/35 |
|---|---|---|---|
| 4,886,586 A | 12/1989 | Morris | 204/128 |
| 5,587,132 A | * 12/1996 | Nakajima et al. | |
| 5,656,390 A | * 8/1997 | Kageyama et al. | 429/44 |

FOREIGN PATENT DOCUMENTS

| EP | 0 814 527 A2 | 12/1997 |
|---|---|---|
| GB | 2 163 595 A | 2/1986 |

* cited by examiner

Primary Examiner—John S. Maples

(57) ABSTRACT

A multicell assembly is constituted by alternately stacking two types of pre-assembled elements: a bipolar electrode holding subassembly and a membrane holding subassembly. The alternate stack of elements is piled over a bottom end element and the stack is terminated by placing over the last membrane holding element a top end electrode element. Each bipolar plate electrode holding element and each ion exchange membrane separator holding element includes a substantially similar rectangular frame piece, made of an electrically nonconductive and chemically resistant material, typically of molded plastic material, having on its upper (assembly) face grooves for receiving O-ring type gasket means, and having through holes and recesses in coordinated locations disposed along two opposite sides of the rectangular frame forming, upon completion of the assembling, ducts for the separate circulation of the negative electrolyte and of the positive electrolyte through all the negative electrolyte flow chambers and all positive electrolyte flow chambers, respectively, in cascade.

6 Claims, 5 Drawing Sheets

MEMBRANE-SEPARATED, BIPOLAR MULTICELL ELECTROCHEMICAL REACTOR

BACKGROUND OF THE INVENTION

1. Field of the Invention

This invention relates to electrochemical reactors for conducting reduction and oxidation reactions in respective positive and negative liquid electrolytes, without gas evolution at the electrodes. More specifically the invention relates to a membrane-separated, bipolar multicell electrochemical reactor for implementing a redox flow battery system.

2. Description of Related Art

Redox flow battery systems are increasingly attracting interest as efficient energy conversion systems. Among redox couple candidates, the all vanadium redox system being one of the most preferred.

Structurally, the electrochemical reactors that have been proposed for redox flow battery systems, have been derived from the electrochemical reactor structures developed for general electrolysis processes, the only adaptation having concerned the materials employed as electrodes.

Generally, the electrochemical reactors used as redox batteries are conventionally composed of a stack of bipolar plate electrode elements separated by ion exchange membranes, defining a positive electrolyte flow chamber on one side of each membrane and a negative electrolyte flow chamber on the opposite side thereof. The stack of bipolar elements is assembled together in a filter-pass arrangement between two end electrode elements.

Commonly, the elements have a frame provided with co-ordinated through holes forming inlet and outlet manifolds for the two electrolytes that are circulated in a parallel mode through the positive electrolyte flow chambers and the negative electrolyte flow chambers, respectively.

The elements are conventionally mounted and operated in a vertical position.

The assembling of a large number of bipolar elements in electrical series as required in redox batteries to reach an adequate voltage at the two ends of the battery, the positioning of innumerable gaskets for sealing the outer perimeter of each electrolyte flow chamber and the perimeter of the distinct through holes of the frames for defining the inlet and outlet manifolds for the two electrolytes and the final tightening of the filter press assembly by tie rods compressing the two end elements over the stack, are extremely delicate and time consuming operations that require particularly skilled technicians.

The parallel flow of the two electrolytes through the respective flow chambers poses serious problems in terms of minimization of so-called stray or by-pass electric currents in uninterrupted liquid veins of electrolyte, due to the fact that the electrolyte present in the manifolds offer innumerable paths for these by-pass or stray currents, driven by mutual voltage differences existing among the various bipolar elements functioning in electrical series between the two end electrodes on which the full battery voltage difference insists. By-pass or stray currents decrement the energy efficiency of the conversion system, but more seriously they cause severe corrosion phenomena on conductive parts (e.g.: carbon) because of extremely high half-cell voltages at the conductor surface.

On the other hand, the redox system require non-negligible electrolyte flow rates through the flow chambers of the reactor in order to maintain optimal half-cell reactions conditions at the electrodes and this requirement may imply the necessity of operating the bipolar electrochemical reactor at relatively high positive pressure.

Differently from conventional electrochemical processing, redox flow battery systems are intended also for uses on nonpolluting vehicles and power/weight ratio is an important parameter.

SUMMARY OF THE INVENTION

A main objective of this invention is to provide a membrane-separated bipolar multicell electrochemical reactor for half-cell reduction and oxidation reactions in respective positive and negative electrolytes, without gas evolution, with an architecture that makes it more easily assemblable by allowing to stack fully pre-assembled elements horizontally, one on top of the other, and suitable to be operated in the same horizontal orientation of the bipolar elements.

According to a fundamental aspect of the novel architecture of the invention, the multicell assembly is constituted by alternately stacking two types of pre-assembled elements, one being a bipolar electrode holding subassembly and the other being a membrane holding subassembly.

Of course, the alternate stack of elements is piled over a bottom end element and the stack is terminated by placing over the last membrane holding element a top end electrode element. The two end electrode elements are then compressed over the stack by tightening a plurality of tie rods, conventionally arranged around the perimeter of the stacked elements, according to a common practice in tightening a filter-press stack in a hydraulically sealed manner, by virtue of the gaskets operatively installed between the coupling faces of the frames of the various elements.

According to an essential aspect of the architecture of the invention, each bipolar plate electrode holding element and each ion exchange membrane separator holding element includes a substantially similar rectangular frame piece, made of an electrically nonconductive and chemically resistant material, typically of molded plastic material, having on its upper (assembly) face grooves for receiving O-ring type gasket means, and having through holes and recesses in coordinated locations disposed along two opposite sides of the rectangular frame forming, upon completion of the assembling, ducts for the separate circulation of the negative electrolyte and of the positive electrolyte through all the negative electrolyte flow chambers and all positive electrolyte flow chambers, respectively, in cascade. The negative electrolyte enters along a first side of a negative electrolyte flow chamber, flows through the chamber toward the opposite or second side thereof, exits the chamber, flows through the coordinated holes through the frame holding the electrode and through the frame holding the next membrane separator, reaching the level of the next negative electrolyte flow chamber and enters it from the same second side through which it exited from the previous negative electrolyte flow chamber and exits this next negative electrolyte flow chamber from the same first side it entered the previous negative electrolyte flow chamber, to flow through coordinated holes through the next pair of frames to the level of the next negative electrolyte flow chamber and so forth. The same flow path is arranged also for the positive electrolyte, either in a "countercurrent" or in an "equicurrent" mode through the battery.

In practice, the bipolar electrochemical reactor does not have inlet and outlet manifolds for the two electrolytes, on the contrary, the electrolytes flow through the respective flow chambers in a zigzag path, that is essentially in hydraulic series or cascade mode instead than in hydraulic parallel mode.

In this way, by-pass current may only be "driven" by a voltage difference of about one-cell voltage and becomes practically negligible and above all it does not cause any corrosion on conductive parts.

The two types of pre-assembled elements are coordinately "keyed" so as to prevent any error in correctly stacking them alternately one over the other and with a correct orientation and perfect mutual alignment to compose the bipolar battery.

Apart from the suitably shaped keying pins and sockets and the position of the through holes and of the slotted portions of communication with the flow chambers, the molded plastic frames are substantially identical for both types of elements.

Essentially, each frame has an inner flange portion, recessed from the bottom (assembly) face of the frame, that is the opposite face to the one that is provided with the grooves for accommodating O-ring gaskets around pass-through electrolyte ducting holes and around the outer seal perimeter of the chamber.

During the pre-assembling of the two types of elements, on this inner flange portion is accommodated a relatively narrow edge perimetral portion of either a bipolar plate electrode or of an ion exchange membrane separator.

The two types of frames may conveniently be made of a different color or tonality for an easy recognition of which is destined to accommodate a bipolar plate electrode or an ion exchange membrane.

The face of the flange portion on which the ion exchange membrane separator or the bipolar plate electrode is set, has a plurality of orderly spaced retention pins that project out of the surface of the flange.

The plate electrodes and the ion exchange membrane separators are distinctively from each other, provided with coordinated through holes into which the retention pins of the respective frame piece pass.

A retention counterflange of an electrically nonconductive and chemical resistant material, typically of the same material and color of the respective type of frame, has also a number of holes coordinated with the positions of the retention pins and is functionally mounted over the perimetral portion of the plate electrode or of the membrane separator, whichever belongs to the particular type of frame, placed on the recessed flange portion of the frame.

The retention counter flange is fixed in position by flattening with a hot tool the protruding portions of the retention pins thus permanently fixing the bipolar plate electrode or the ion exchange membrane separator in the central window of the respective frame.

The rectangular shape of the frame windows into which membranes and bipolar plate electrodes, cut or made to size, are fitted, minimizes any waste of valuable membrane and bipolar plate material. A tight fitting of the counterflange effectively seals the contour of the membrane or bipolar plate preventing electrolyte intermixing reducing the number of gaskets. Optionally spacer gaskets may be used when necessary, for example to mount a particularly thin membrane.

This arrangement permits to overturn the so pre-assembled elements without the risk that the fitted bipolar plate electrode or ion exchange membrane separator may fall off and therefore permits to easily dispose the O-ring gaskets on the opposite (upper) face of the frame suitably provided with accommodating grooves.

Each pre-assembled element of a first type, may be overturned, placed on top of the stack and O-ring gaskets may be placed in the respective grooves before placing the next pre-assembled element of the other type on top, ready to receive the O-ring gaskets thereon and another pre-assembled element of the first type, and so on until completing the stack.

The keying pins and sockets, besides obliging a correct alternate stacking and orientation of bipolar electrodes and membrane separators pre-assembled elements, impose also a correct orientation on the plane of the elements such that the though holes and slotted portions coordinate with each other realizing the zigzag serial flow path of the two electrolytes.

Preferably the battery stack is made up of an integer multiple number of blocks each constituted by four alternately coupled elements: two membrane elements and two bipolar elements the battery having an even number of cells. In this way each electrolyte will enter and exit the battery from the same side.

Often and most preferably, the electrode consists of a porous fabric or mat of carbon fibers in electrical continuity with a similar electrode structure on the opposite face of the conductive bipolar plate electrode for providing substantially three-dimensional electrode structures having a large active area, that extends for a considerable portion into the depth of the relative electrolyte flow chamber.

This arrangement, dictated by the need to increase the allowable rate of half-cell reaction process at the electrode, contrasts with the need to minimize the power absorbed by the motors that drive the pumps of the two electrolytes to flow them through the plurality of respective flow chambers at an adequate flow rate.

This problem is aggravated when passing from a parallel flow of the electrolyte through all the respective flow chambers from a common inlet manifold to common outlet manifold to a cascade flow from one chamber to the next and so forth from one end to the opposite end of the stack.

Although this cascade flow mode is extremely effective in eliminating any corrosion problems due to by-pass currents, it necessarily implies an augmented pressure drop through the battery of the two electrolytes.

According to an important optional feature of the battery architecture of the invention, useful in case of use of porous three-dimensional electrodes extending from the impervious electrically conductive bipolar plate, this increase of pressure drop due to the use of a series or cascaded flow path of the electrolytes through the respective pluralities of flow chambers when using porous mat electrodes encroaching into the flow chamber is practically eliminated while reducing or even eliminating any residual gap or unobstructed flow space between the porous electrode and the ion exchange membrane separator, which, may even be placed in contact with each other to minimize ohmic losses in the liquid electrolyte.

These apparently contradictory conditions are indeed accomplished according to the present invention by defining (cutting) in the porous electrode two orders of parallel flow channels, all the parallel spaced channels of each order extend from a common orthogonal base channel formed along the respective inlet or outlet side of the chamber and terminate short of reaching the base channel of the other order. Each order defines a comb-shaped flow distributing channelwork the parallel fingers of which interleave with the finger channels of the other order.

Practically, one comb-shaped channelwork has its base or manifolding channel running along a side of the chamber communicating with the inlet duct of the electrolyte into the chamber while the other specular comb-shaped channelwork has its parallel finger channels interleaved with the parallel finger channels of the first channelwork and has its base or manifolding channel running along the opposite side of the chamber communicating with the outlet electrolyte duct.

The interleaved finger flow channels or one order run parallel to each other, each terminating short of the manifolding base channel of the other order of interleaved parallel finger channels. Therefore, each inlet or "source" flow channel is separated from the two adjacent outlet or "drain" flow channels by a strip of a certain width of the three-dimensional porous electrode material, separating the parallel channels that may be eventually cut in it.

The interleaved orders of inlet and outlet electrolyte flow channels evenly distribute the electrolyte with a reduced pressure drop uniformly throughout the electrode area of the flow chamber, providing flow distribution channels throughout the mass of the three-dimensional porous electrode.

The pressure drop may be pre-arranged within a certain margin, by knowing the specific pressure drop of the electrolyte through the three-dimensional porous electrode material at a given flow rate and by designing the two orders of interleaved "source" and "drain" flow channels with an appropriate distance of separation from one another.

Besides outstandingly reducing the pressure drop suffered by the electrolyte flowing through the respective flow chambers in series from one end to the opposite end of the battery, this arrangement of interleaved "source" and "drain" channels, suitably cut through the thickness of the three-dimensional porous electrode, is found to outstandingly enhance the electrochemical performance of the battery because of a far more evenly distributed current density over the entire cell area of the battery.

The invention is more clearly defined in the annexed claims.

BRIEF DESCRIPTION OF THE DRAWINGS

The different features and related advantages of the novel electrochemical battery architecture will become even more evident through the following description of several preferred embodiments and by referring to the attached drawings, wherein.

DESCRIPTION OF SEVERAL EMBODIMENTS OF THE INVENTION

FIGS. 1, 2, 3, 4 and 5 illustrate a battery realized according to a preferred embodiment of the present invention.

Figure 1:
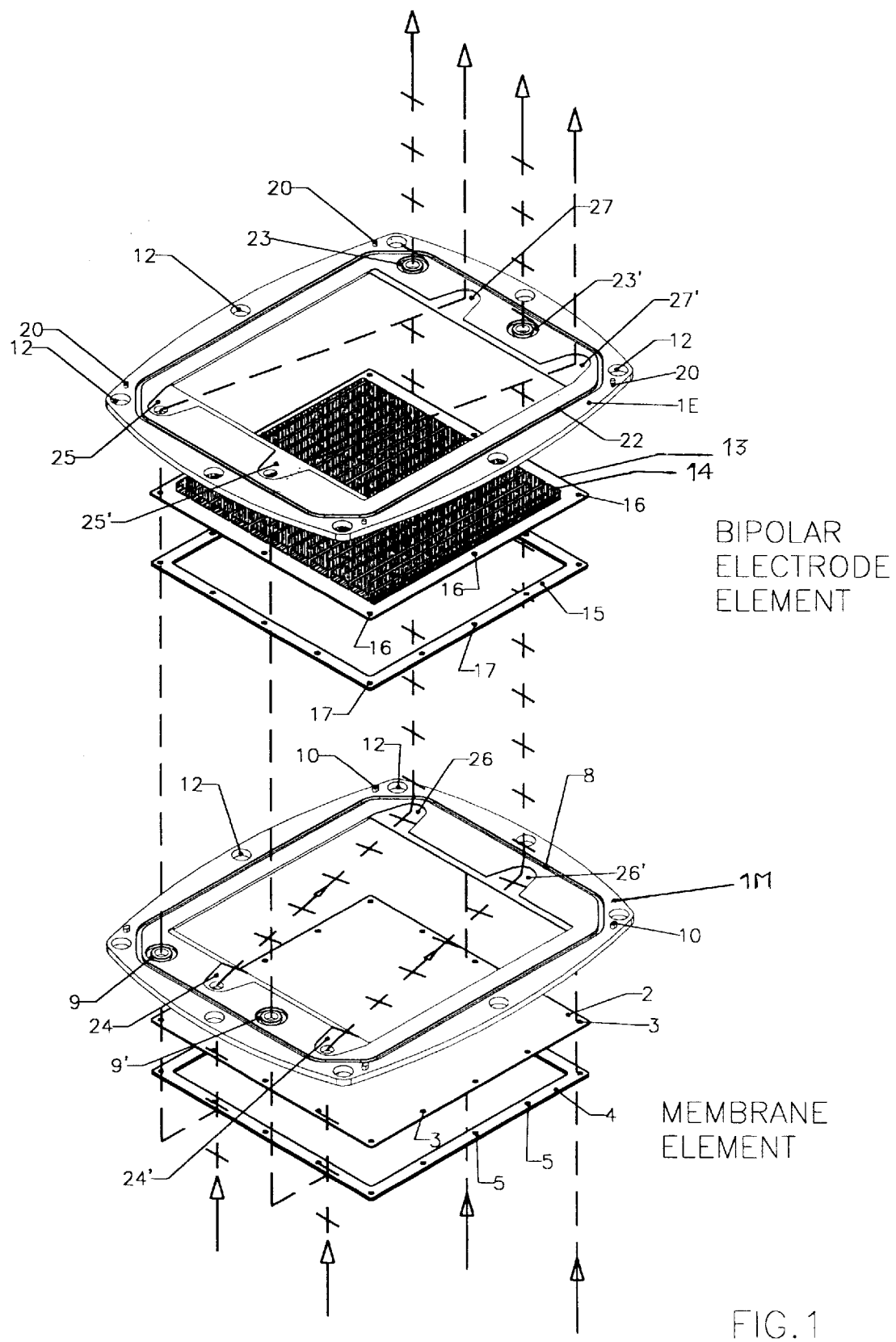
FIG. 1 is an exploded view of a membrane element and a bipolar electrode element according to a preferred embodiment.

The exploded view of FIG. 1, representing the two types of the pre-assembled elements, namely a membrane element and a bipolar electrode plate element, provides an explicative overview of the architecture of the invention, according to a preferred embodiment.

The frame portion 1M of membrane element and the frame portion 1E of a bipolar electrode element are under many aspects substantially similar. Both may be of a molded plastic material such as for example polypropylene, different molds being employed for the two types of frames 1E and 1M, for implementing suitably different keying pins and sockets.

According to a most preferred embodiment, the molded plastic frames 1M and 1E define a rectangular inner window, however, the outer perimeter of the frame is not rectangular but has a peculiarly curved shape, determined by the fact that each side of the frame has a convex outer edge, making the width of the cross section of the frame larger near the central portion of each side than near to corners. This particular shape of the frame optimizes weight versus structural strength, in consideration of the electrolyte pressure withstanding requisites. Indeed, the completed battery assembly is hydraulically tested to withstand a maximum electrolyte pressure of up to 5 atmospheres. The convex shape of the sides of the frame body has been found to best respond to the flexural strength requisite by reducing stress concentrations and achieving a most efficient weight/pressure resistance ratio.

In the exploded view of FIG. 1, the flow paths of the positive electrolyte and of the negative electrolyte through the respective positive electrode and negative electrode flow chambers are schematically traced by flow lines depicting the respective positive (+) and negative (−) signs.

The electrolyte flow paths are shown, according to stacking orientation of the elements of the battery starting from a horizontally disposed bottom terminal element consisting of a positive end electrode.

In the figure, the lower element is a membrane element showing a rectangularly cut membrane 2 which may be either a cation exchange membrane such as sulphonated polyethylene membrane or a polystyrene sulphoric acid membrane or similar chemically resistant membrane or an anion exchange membrane.

The membrane 2, cut to size, has also a number of holes 3 punched along its perimetral portion at pre-ordinated positions. Similarly, a fixing counterflange 4, generally of the same material of the frame piece 1M, has holes at pre-ordered positions, geometrically coinciding with the positions of the holes 3 of the membrane 2.

Figure 2:
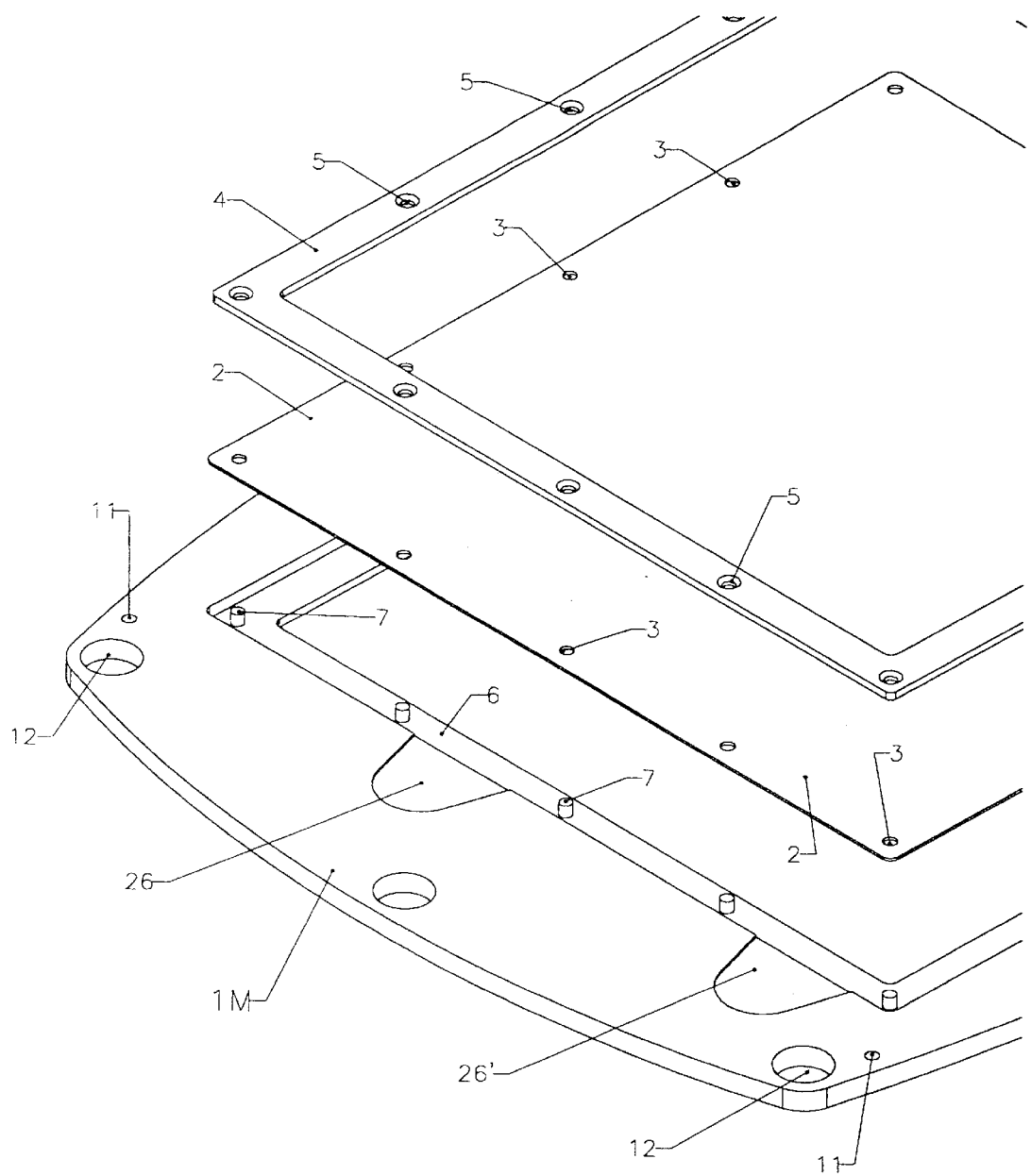
FIG. 2 is a fragmentary detail view of an upturned membrane element detailing the way the membrane is fitted into the rectangular window of the frame.

By looking at FIG. 2, a detail enlarged view of the membrane element of FIG. 1, overturned by 180°, it is shown how the membrane 2 and the fixing counterflange 4 are accommodated over the recessed inner flange portion 6 of the frame 1M, the coordinated holes 3 and 5 of the membrane and of the retaining counterflange 4 respectively fitting on the array of molded retention pins 7 present on the face of the flange portion 6.

Spacer rubber gaskets may be disposed on the flange portion 6 before installing the membrane 2 and a second rubber gasket may be interposed between the membrane 2 and the fixing counterflange 4 to adjust to the required depth of the respective flow chambers on the opposite sides of the membrane 2 and/or to prevent leakages of the negative electrolyte into the positive electrolyte or viceversa by possible pressure differences in the two flow chambers on the opposite sides of the separating membrane 2.

Alternatively, a suitable sealant such as for example a silicone gel sealant may be used in pre-assembling the element to ensure a leakproof assembly.

By appropriate implements, the retaining counterflange 4 is eventually pressed over the membrane and the ends of the retention pins 7 protruding out of the holes 5 of the counterflange 4 are heat-riveted by the use of a heated tool, causing the "molding" of the molten tip of the pins 7 into the swaged holes 5 of the fixing flange 4.

Upon "riveting" the retention pins 7, the element is completely pre-assembled and may be stacked over a last-mounted bipolar electrode element in an overturned condition, without any risk for the pre-installed membrane to fall off.

Moreover, the upper face of the molded frame piece 1M of the membrane element may readily receive, if not already installed, a perimetral seal O-ring gasket 8 and the two negative (or positive) electrolyte ducts O-rings, 9 and 9'.

The upper face of the frame piece 1M of the membrane element has at least two, preferably four, keying pins 10, which, in the example, have an oblong cross section, while on the lower face, partially visible in the detail view of FIG. 2, two or preferably four pin sockets 11 are present, which in the example shown, have a circular cross section.

In the example shown in the figures, the tie rods that complete the battery assembly pass through the holes 12, formed ordered in the perimetral portion of all the frames and of the two end elements, external to the perimetral seal O-ring gasket 8.

The upper group of the exploded view of FIG. 1, depicts a bipolar electrode element.

According to a most preferred embodiment of the battery of the invention, the bipolar plate electrode is an electrically conductive composite that includes a central conductive plate 13, typically a glassy carbon plate with a thickness in the order of 1 to 3 or more millimeters, having bonded over its opposite faces a carbon felt electrode structure 14 of a thickness (depth) that may generally be comprised between 1 and 5 or more millimeters.

The felt electrodes 14 are bonded in electrical continuity to the conductive septum 13 and have a relatively open structure such to be readily permeated by the electrolyte flown through the electrode chamber.

The bipolar plate electrode composite, 13–14, is mounted in a respective frame piece 1E of a molded thermoplastic, typically of the same type with which are produced the frame pieces 1E of the membrane elements.

The pre-assembling of the bipolar electrode element is totally similar to the pre-assembling of a membrane element.

A different disposition of the coordinated plurality of holes 16 in the perimetral portion of the electrically conductive carbon plate septum 13 and of the holes 17 in the retention counterflange 15, and of course also of the retention pins 18 (FIG. 3) on the recessed inner flange portion 19 of the frame 1E, will prevent any possibility of error in pre-assembling the two types of stackable elements.

Figure 3:
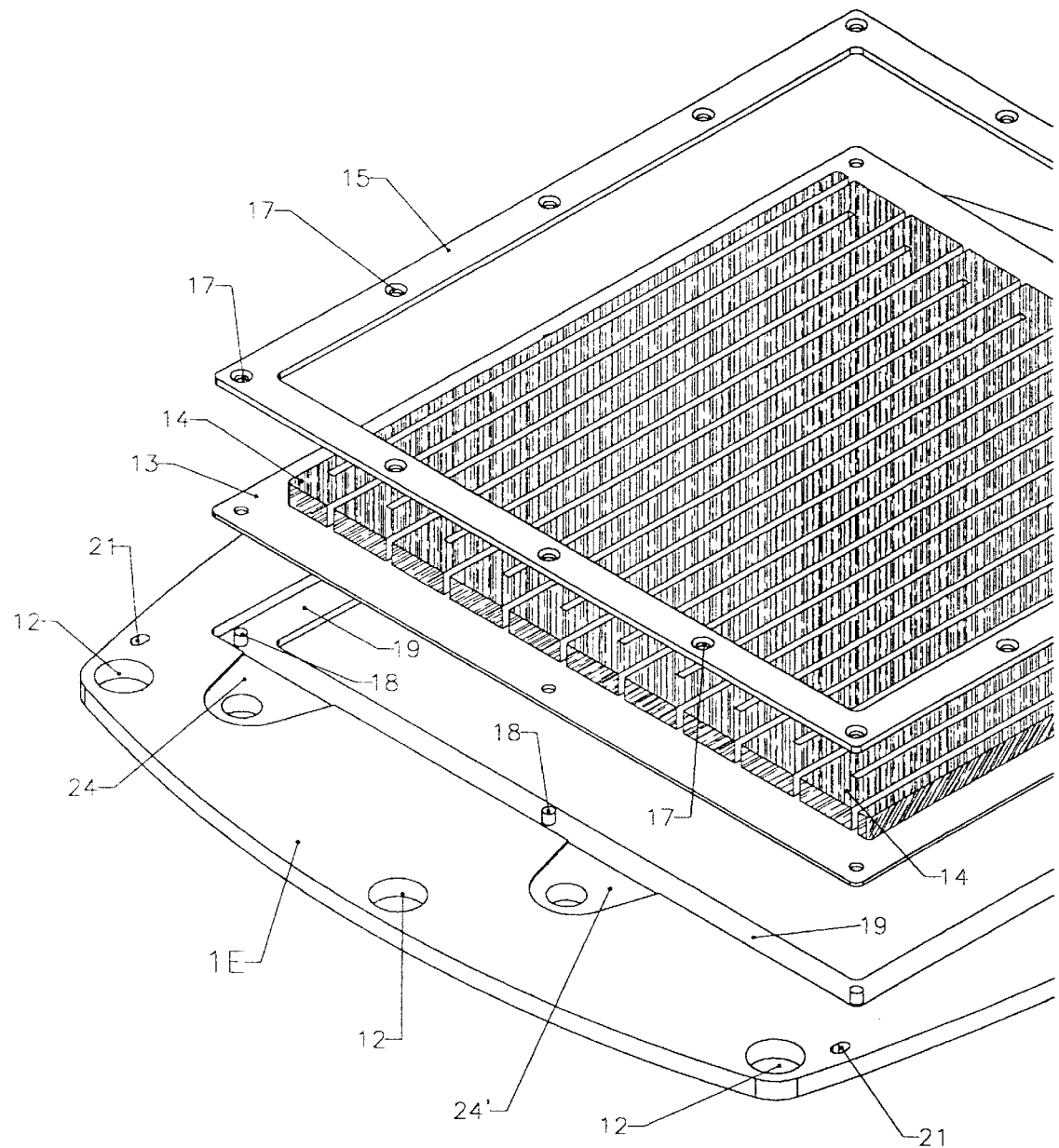
FIG. 3 is a fragmentary detail view of an upturned bipolar electrode element detailing the way the membrane is fitted into the rectangular window of the frame.

FIG. 3 is an enlarged detail view of the bipolar electrode element of FIG. 1, overturned by 180°.

Differently from the frame piece 1M of the membrane element, the frame piece 1E of the bipolar electrode element has, on the upper face keying pins 20 (FIG. 1) having a circular cross section of a diameter appropriate to fit into the circular sockets 11 present on the underside of the frame piece 1M of a membrane element. As visible in the upturned view of FIG. 3, on the upper side of the molded frame piece 1E of the bipolar electrode element (FIG. 1), there are sockets 21 with an oblong cross section suitable to accommodate the keying pins 10 present on the upper side of the molded frame piece 1M of the membrane element.

Similarly to the frame piece 1M of the membrane elements, also the frame piece 1E of the bipolar electrode element has on its upper face grooves for accommodating a perimetral sealing O-ring 22 and two positive (or negative) electrolyte ducts O-rings 23 and 23'.

According to a most preferred embodiment depicted in the drawings, the porous carbon mat electrodes 14 have two distinct orders or channelworks of parallel and mutually interleaved electrolyte distributing channels oriented along the same direction of the electrolyte flow through the respective electrolyte flow chamber, starting from the inlet recessed slots 24 and 24' and 25 and 25' for the positive and negative electrolytes, respectively, to the outlet recessed slots 26 and 26' and 27 and 27', functionally present on opposite sides of the chamber.

Of course, though in the example two ducts and relative slots are shown, depending on the side of the cells there may be only one duct and slot or any number of ducts and slots for a better distribution and/or for reducing hydraulic pressure drops.

As depicted in FIGS. 1, 3, 4 and 5, a first "comb-shaped" channelwork has the finger channels s1, s2, s3, . . . , sn, extending parallel to each other from a base or manifolding channel S defined along the side of the electrolyte flow chamber through which the electrolyte enters the chamber through the inlet slots, connecting with the respective electrolyte ducts, and end short from reaching the corresponding manifolding or base channel D defined along the opposite side of the flow chamber where the electrolytes exits the chamber through the outlet slots communicating with the respective electrolyte ducts.

Similarly, the second comb-shaped channelwork has finger channels d1, d2, d3, . . . dn, extending parallel to each other from their base or manifolding channel D and they are interleaved with the finger channels s1, s2, s3, . . . , of the first comb-shaped channelwork. The finger channels d1, d2, d3, . . . of the second comb-shaped channelwork, terminate short of reaching of the base or manifolding channel S of the first channelwork.

The two interleaved orders of channels, s1, s2, s3, . . . , and d1, d2, d3, . . . , constitute an electrolyte distributing (source) channelwork and an electrolyte draining (drain) channelwork.

Figure 4:
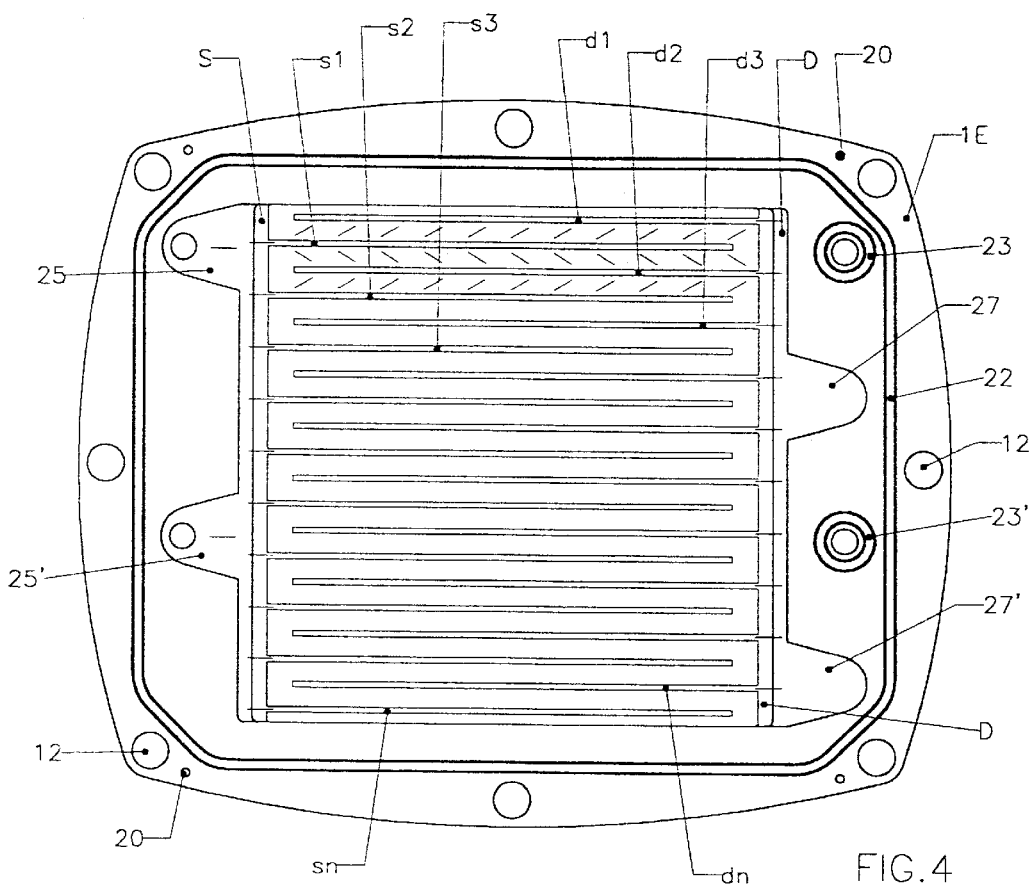
FIG. 4 is a plan view of a bipolar plate electrode element using electrode structures in the form of a carbon felt or fabric, according to a preferred embodiment of the invention.

As may be observed in the plan view of FIG. 4 and in FIGS. 1 and 3, the respective base or manifolding channels S and D for the incoming electrolyte and for the electrolyte exiting the flow chamber, respectively, are defined by having the felt electrode 14 ending at a certain distance from the side wall of the flow chamber so that the electrolyte entering the flow chamber through the inlet slots 24 and 24' (FIG. 3) or 25 and 25' (FIGS. 1 and 4) is able to distribute itself in this base or manifolding inlet channel S and from there to evenly distribute itself along the source finger channels s1, s2, s3, . . . .

The drain finger channels d1, d2, d3, . . . , interleaved with the source finger channels, provide as many drain channels for the electrolyte directed to the exit slots 27 and 27' (FIG. 4).

The electrolyte is in this way evenly distributed throughout the mass of porous carbon fiber felt electrode 14 with a resulting low pressure drop.

As schematically indicated by the idealized flow arrows in FIG. 4, the electrolyte is practically subjected to flow laterally through a limited segment of carbon felt, effectively refreshing the electrolyte throughout the active electrode surface, on account of the fact that the cooperating interleaved source and drain channelworks provide for a flow path with a negligible pressure drop across the electrolyte flow chamber.

It has been found that with such a channelwork electrode configuration, the carbon felt electrode may occupy the entire depth of the electrolyte flow chamber of the cell, allowing for the membrane separator to abut directly against the surface of the channeled carbon felt electrode, minimizing ohmic drop in the electrolyte.

The two channelworks may be defined in the carbon felt electrode by cutting it after having been bonded to the bipolar electrode plate 13 or before. Indeed, a carbon felt may be pre-defined by cutting it with a die punch and adhered to a backing sheet to facilitate its handling throughout the bonding process. The backing sheet may ultimately be peeled off the surface of the bonded electrode or removed in any other suitable manner.

Figure 5:
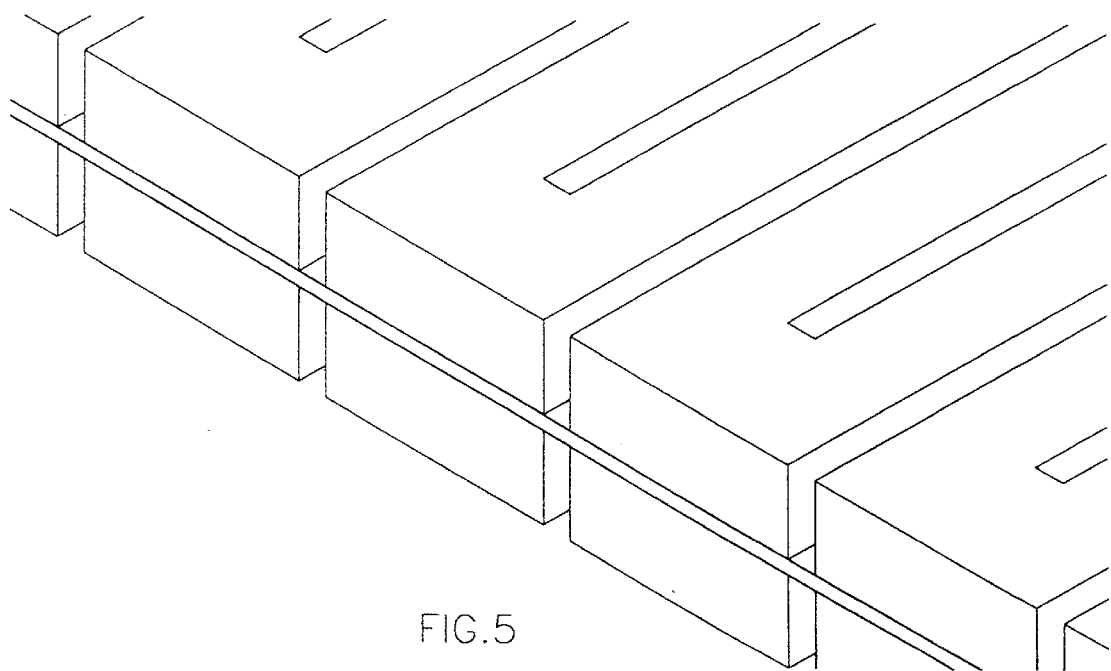
FIG. 5 is a fragmentary delay cross section of the bipolar plate electrode of FIGS. 1 and 3.

FIG. 5 is an enlarged detailed view of the peculiar structure of the composite bipolar plate electrode of the battery of the invention.

Figure 6:
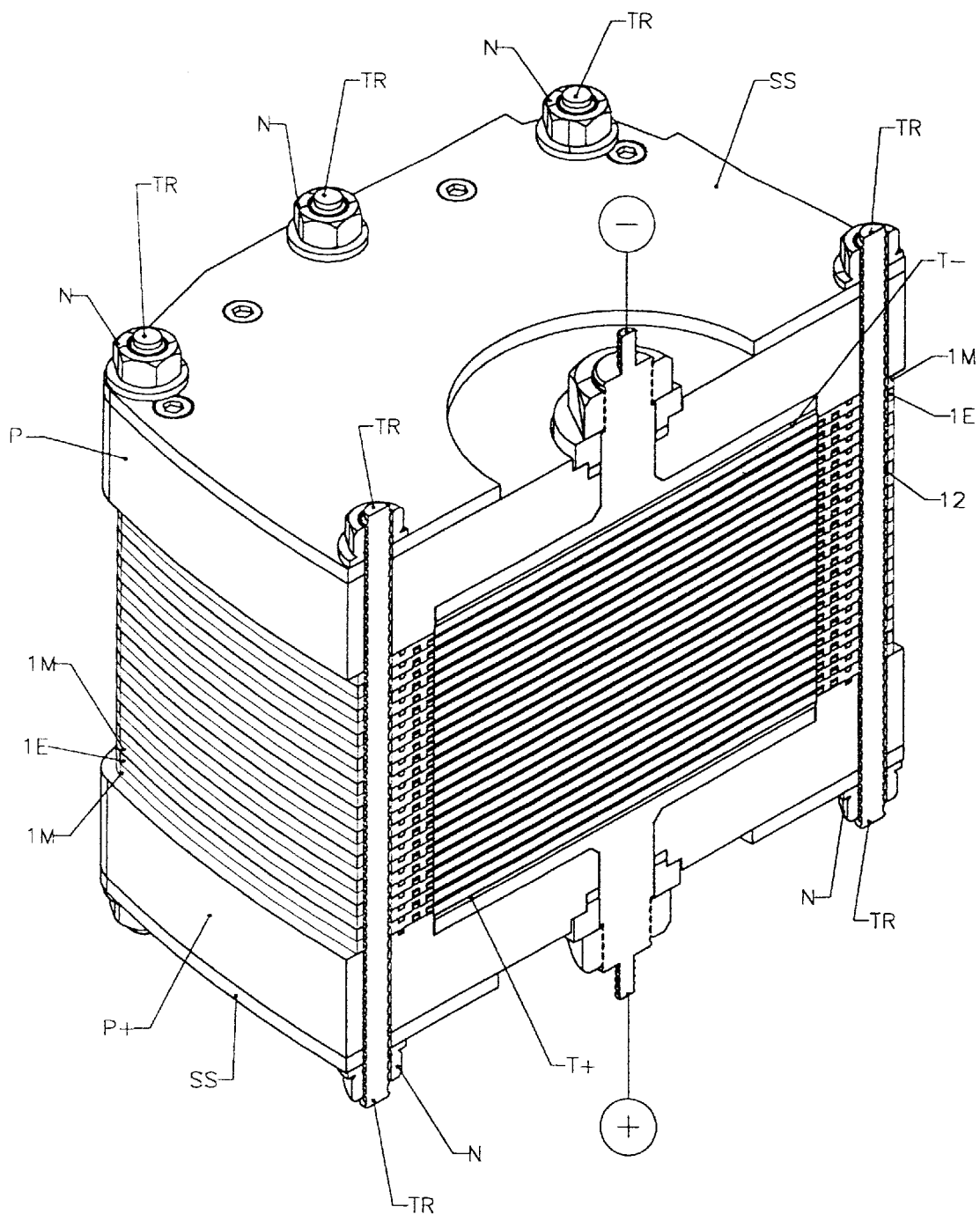
FIG. 6 is a cross sectional three-dimensional view of a completely assembled battery stack.

FIG. 6 is a cross sectional three-dimensional view of an assembled battery stack.

The bottom end electrode, that in the example shown is constituted by a positive carbon electrode, T+ and the upper terminal electrode T- are set in sturdy end plates of a molded plastic P+ and P-, respectively, which are reinforced by a stress plate of stainless steel SS, onto which act the compression nuts M upon tensioning the tie rods TR.

The use of plastic end plates P+ and P- facilitate the constitution of a perfectly sealed and corrosion proof terminal for electrical connection of the battery in the external circuit.

As shown, the battery of the invention besides being able to be assembled in a horizontal position, it may also be maintained in such a horizontal position during operation.

The orientation of all positive electrodes under the membrane separator of the respective cell and consequently all negative electrodes above the membrane separator, is a preferred orientation.

In fact, during operation a minimum amount of hydrogen evolution of the negative electrodes and of oxygen evolution on the positive electrodes may occasionally and accidentally occur.

According to this preferred orientation, the eventually evolved oxygen will raise by buoyancy toward the membrane separator and the hydrogen to the base of the negative electrode, both the oxygen and the hydrogen being eventually flown out with the electrolyte.

In this way, a continued contact of oxygen with the base plate of the carbon electrodes which could provoke oxidation (corrosion) of the carbon is minimized. Moreover, the polymeric membrane that is substantially permeable to hydrogen could permit a certain migration of hydrogen through the membrane, if the cell stack is overturned.

The ability to mount the cell elements and operate the battery in a substantially horizontal orientation instead of in a traditional vertical orientation, has been found to be advantageous, not only because of the great ease with which the battery is assembled but also in operating the battery, especially in the case of batteries of a particularly large cell area. The vertical orientation reduces mechanical stresses and permits a more efficient construction of the elements and also eases hydraulic sealing problems.

What is claimed is:

1. A membrane-separated, bipolar multicell electrochemical reactor for half-cell reduction and oxidation reactions in respective positive and negative liquid electrolyte solutions without gas evolution, said reactor comprising:

a plurality of alternately disposed bipolar plate electrode elements and ion exchange membrane separator elements defining a positive electrolyte solution flow chamber on one side of each membrane and a negative electrolyte solution flow chamber on an opposite side thereof, said plurality of alternately disposed bipolar plate electrode elements and ion exchange membrane separator elements being sealingly assembled together in a filter-press arrangement between two end electrode elements electrically coupled into an electric circuit which includes an electrical source forcing a current through the electrochemical reactor or an electrical load absorbing a current from the electrochemical reactor, said bipolar plate electrode elements and said ion exchange membrane separator elements including a frame portion of an electrically nonconductive and chemically resistant material cooperating with sealing gasket means for sealing, and having through holes and recesses in coordinated locations forming, upon assembly, ducts for a separate circulation of a negative electrolyte solution and of a positive electrolyte solution, cascadedly in all said negative electrolyte solution flow chambers and in all said positive electrolyte solution flow chambers, respectively, wherein each of a plurality of frames of said bipolar plate electrode elements and of said ion exchange membrane separator elements have an inner flange portion recessed from a first planar face of the frame on an opposite side of an other face of the frame having grooves for accommodating O-ring gaskets around pass-through electrolyte-ducting holes and around an outer seal perimeter, accommodating thereon a perimetal portion of the respective bipolar plate electrode or ion exchange membrane separator;

a plurality of retention pins projecting out of the surface of said flange portion and passing through holes of said perimetral portion of the plate electrode or membrane separator accommodated thereon;

a retention counterflange of an electrically nonconductive and chemically resistant material having holes coordinated with the positions of said retention pins and functionally mounted over said perimetral portion of said plate electrode or said membrane separator on said recessed flange portion of the frame, and permanently fixed thereon by flattened heads of said retention pins protruding out of said coordinated holes of the counterflange; and pre-assembled bipolar plate electrode elements and membrane separator elements being alternately stacked in a horizontal position with said other face of the frames carrying the O-ring gaskets facing in an upward direction.

2. The electrochemical reactor of claim 1, wherein said other face and said first planar face of each frame portion have a plurality of keying and alignment pins and sockets, respectively, of different shape from each other, said plurality of keying and alignment pins and sockets preventing the stacking of said bipolar plate electrode elements and said ion exchange membrane separator elements in an incorrect alternate order and in an incorrect orientation.

3. The electrochemical reactor of claim 1, wherein said inner flange portions, said bipolar plate electrodes and said ion exchange membrane separators are rectangular and said frame portions have convex outer sides.

4. The electrochemical reactor of claim 1, wherein a direction of flow of said negative electrolyte solution opposes a direction of flow of said positive electrolyte solution in respective flow chambers along opposite sides of each ion exchange membrane separator.

5. The electrochemical reactor of claim 1, wherein each of said bipolar plate electrodes comprises a fluid-impervious, electrically conductive plate, said electrically conductive plate having, on opposite faces thereof, porous fluid-pervious three-dimensional electrode structures including a material of carbon fibers bonded in electrical continuity to said electrically conductive plate, the electrolyte solution entering the electrode chamber along one side and exiting the chamber from an opposite side, wherein said porous electrode structure has two distinct comb-shaped channelworks, each of a plurality of finger channels of a source channelwork being substantially parallel to each other and interleaved with a plurality of substantially parallel finger channels of a drain channelwork;

the source comb-shaped channelwork having a base manifolding channel running along a side of a chamber through which the electrolyte solution is fed into the chamber, and the drain channelwork having a base manifolding channel running along an opposite side of the chamber from which the electrolyte solution exits the chamber;

wherein all finger channels of said source channelwork extend from the respective base manifolding channel and terminate short of reaching the manifolding channel of the drain channelwork.

6. The electrochemical reactor of claim 1, wherein the ducts for the separate circulation of each of said negative and positive electrolyte solutions defined by said through holes across the thickness of each frame portion of said bipolar plate electrode elements and of said ion exchange membrane separator elements are defined by two or more holes spaced along one side of the substantially rectangular frame portion.

* * * * *